US010411926B2

(12) United States Patent
Dolgin et al.

(10) Patent No.: US 10,411,926 B2
(45) Date of Patent: *Sep. 10, 2019

(54) PRECISION LARGE PHASE MODULATION PHASE MEASUREMENT SYSTEM

(71) Applicant: Raytheon Company, Waltham, MA (US)

(72) Inventors: Benjamin Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,754

(22) Filed: Oct. 1, 2018

(65) Prior Publication Data

US 2019/0036748 A1 Jan. 31, 2019

Related U.S. Application Data

(63) Continuation of application No. 15/458,233, filed on Mar. 14, 2017, now Pat. No. 10,091,039.

(60) Provisional application No. 62/307,744, filed on Mar. 14, 2016.

(51) Int. Cl.
*H04L 27/20* (2006.01)
*H04L 5/00* (2006.01)
*H04L 27/16* (2006.01)

(52) U.S. Cl.
CPC ............ *H04L 27/20* (2013.01); *H04L 5/0048* (2013.01); *H04L 27/16* (2013.01)

(58) Field of Classification Search
CPC ................................ H04L 27/16; H04L 27/20
See application file for complete search history.

(56) References Cited

U.S. PATENT DOCUMENTS

| 8,552,381 | B2 | 10/2013 | Fainchtein et al. |
| 9,241,115 | B2 | 1/2016 | Owens et al. |
| 10,091,039 | B2 * | 10/2018 | Dolgin .................... H04L 27/20 |
| 2008/0166978 | A1 | 7/2008 | Cheah |
| 2010/0027689 | A1 | 2/2010 | Kohlmann |

* cited by examiner

*Primary Examiner* — Ross Varndell
(74) *Attorney, Agent, or Firm* — Cantor Colburn LLP

(57) ABSTRACT

A phase detection system includes first and second phase mixing circuits in signal communication with a signal phase adjuster module. The first mixing circuit generates a first digital modulated frequency signal based on an input signal and a first reference phase signal. The second mixing circuit generates a second digital modulated frequency signal based on the input signal and a second reference phase signal, which phase shifted with respect to the first reference phase signal. The phase detection system further includes a phase identification (ID) module in signal communication with the first mixing circuit and the second mixing circuit. The phase ID module generates a phase signal based on the first digital modulated frequency signal and the second digital modulated frequency signal. The phase signal indicates a phase of the input signal.

20 Claims, 2 Drawing Sheets

PRECISION LARGE PHASE MODULATION PHASE MEASUREMENT SYSTEM

CROSS REFERENCE TO RELATED APPLICATION

This patent application claims priority to U.S. patent application Ser. No. 15/458,233, filed Mar. 14, 2017, which claims the benefit of earlier filed U.S. Provisional Application Ser. No. 62/307,744 filed Mar. 14, 2016, the disclosure of which is incorporated by reference herein in its entirety.

BACKGROUND

The disclosure relates generally to signal processing systems, and more particularly, to phase detection systems configured to measure phases of modulated signals.

The conventional approach for measuring a phase-modulated test signal with changing amplitude is to mix the test signal with a reference signal that is "very stable". A very stable reference signal is one that has characteristics (frequency and amplitude) that are significantly more stable than the test signal itself. The voltage of the resulting output signal is proportional to the sine of the phase difference between the test signal and reference signal. However, this proportionality of the output signal, referred to as the calibration constant, still needs to be determined.

When the value of the phase changes between the reference signal and a respective input test signal, the deviation from a zero reference value is proportional to the difference in phase between the reference signal and the respective input signal. Accordingly, this proportionality can be maintained when the phase angle differential between the reference signal and the input test signal is relatively low, e.g., where difference is about 45 degrees. When, however, the difference approaches or exceeds 90 degrees, the amplitude of the mixed output signals are no longer proportional to the difference in phase between the reference signal and the respective input test signals.

Conventional phase measurement techniques, as described above, suffer from two major problems: they lose sensitivity when the total modulation angle is a multiple of 90 degrees and they have limited ability to distinguish between phase and amplitude modulation. Furthermore, the calibration constant can vary based on temperature and other environmental variables.

SUMMARY

According to a non-limiting embodiment, a phase detection system comprises a signal phase adjuster module configured to generate a first reference phase signal and a second reference phase signal. The first reference phase single has a first phase and the second reference phase signal has a second phase that is offset with respect to the first phase. The phase detection system further includes a first mixing circuit and a second mixing circuit. The first mixing circuit is configured to receive an input signal, and to generate a first digital modulated frequency signal based on the first reference phase signal and the input signal. The second mixing circuit is configured to receive the input signal, and to generate a second digital modulated frequency signal based on the second reference phase signal and the input signal. A phase identification (ID) module is in signal communication with the first mixing circuit and the second mixing circuit. The phase ID module is configured to generate a phase signal based on the first digital modulated frequency signal and the second digital modulated frequency signal.

According to another non-limiting embodiment, a multi-stage phase detection system comprises a first circuit stage and a second circuit stage. The first circuit stage includes a signal phase adjuster module and a phase identification ID module. The signal phase adjuster module is configured to generate a first reference phase signal having a first phase and a second reference phase signal having a second phase that is offset with respect to the first phase. The phase ID module is configured to generate a first modulated analog signal based on an input signal and a first reference signal, to generate a second modulated analog signal based on a second reference signal and the input signal, and to generate an output phase signal based on a phase differential ($\varphi$) between a first phase angle of the first modulated analog signal and a second phase angle of the second modulated analog signal. The second circuit stage includes a low pass filter and a low-frequency phase shift module. The low pass filter is in signal communication with the phase ID module, and is configured to output a filtered low frequency signal based on the output phase signal. The low-frequency phase shifter module in signal communication with the low pass filter, and is configured to generate a phase-modulated reference signal based on the filtered low frequency signal and a phase-offset reference signal. The second stage circuit further includes a second stage mixer module in signal communication with the low-frequency phase shifter module. The second stage mixer module is configured to generate a modulated frequency signal based on the phase-modulated reference signal and the input signal.

According to yet another non-limiting embodiment, a method of measuring a phase-modulated signal having a changing amplitude comprises generating a phase signal having a phase based on an input signal and a reference signal, and filtering the phase signal to generate a filtered low frequency phase signal. The method further includes offsetting the reference signal to generate a phase offset reference signal, and mixing the filtered low frequency phase signal with the phase offset reference signal to generate a phase-modulated reference signal. The method further includes mixing the input signal with the phase-modulated reference signal so as to shift the phase of the input signal according to the phase signal such that low frequency modulation components of the input signal are eliminated.

DETAILED DESCRIPTION

Figure 1:
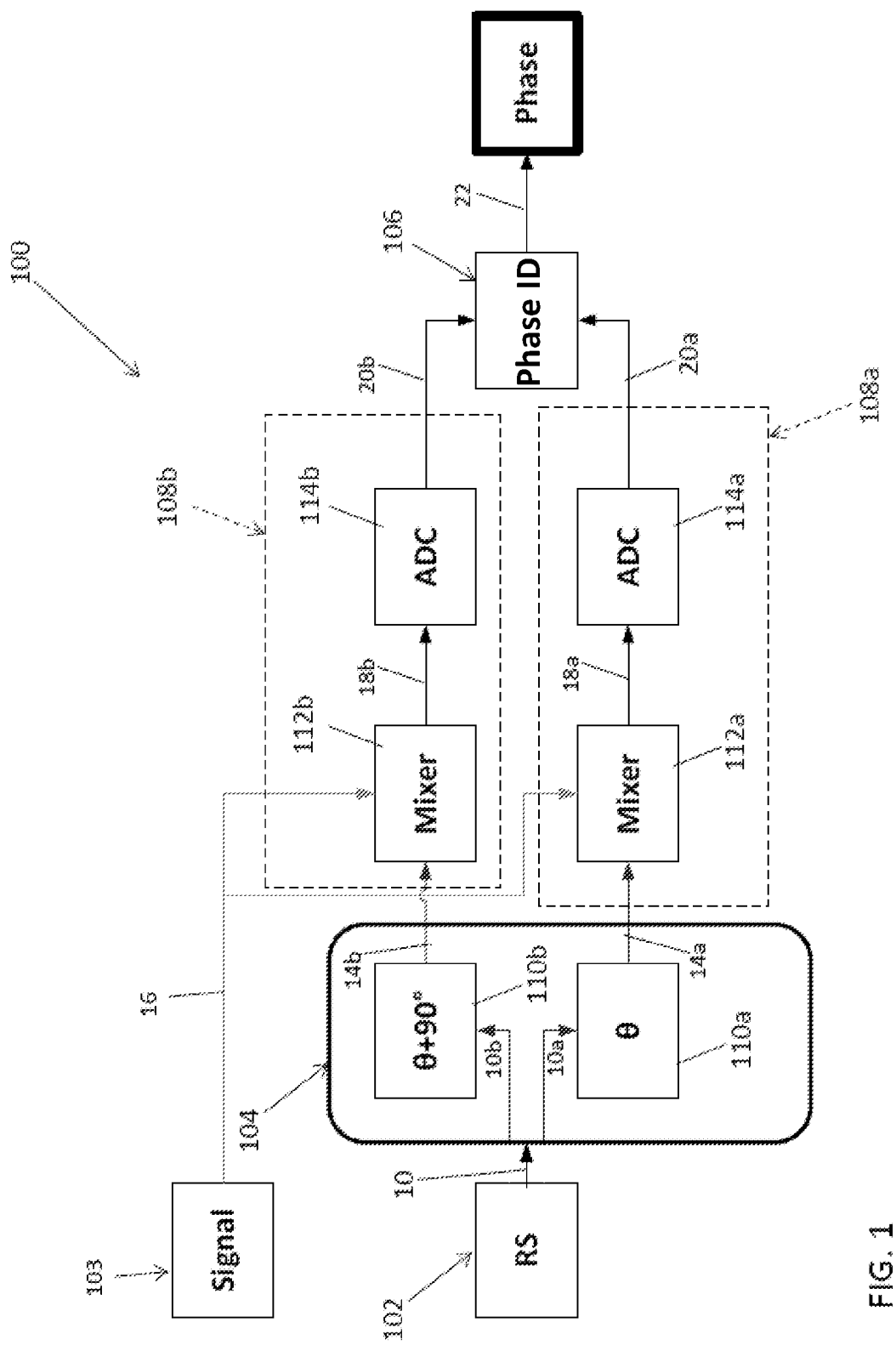
FIG. 1 illustrates a block diagram of a low frequency phase detection system according to a non-limiting embodiment.

Herein, phase measurements circuits and methods are described. At least one non-limiting embodiment provides a phase detection system including a first stage and a second stage. The first stage is configured to perform low frequency phase detection. The second stage utilizes the output of the first stage to perform high frequency phase detection. The first stage mixes two copies of an input test signal with two copies of a reference signal. Copies of the reference signals are shifted by 90 degrees with respect to each other. The outputs of the mixers are the sine and cosine of the phase difference, correspondingly, and can be utilized to determine the phase of the input test signal.

In at least one embodiment, phase measurements can be formed by digitizing both signals and calculating the phase angle. One advantage of the technique described herein is that the calibration constant of the measurement circuit (number of degrees per volt) does not require precise measurement. Instead, the calibration constant is measured instantaneously. The calibration is based on the fact that the sum of squares of sine and cosine of the same angle is one ($\sin^2(\alpha)+\cos^2(\alpha)=1$). Accordingly, the system can employ two individual mixing circuits which generate digital modulated signals representing the low-frequency components of the input test signal. The modulated signals representing the low-frequency outputs of mixing circuit should satisfy the same equation, (i.e., ($\sin^2(\alpha)+\cos^2(\alpha)=1$)). In practice, copies of the reference signal are shifted by approximately 90 degrees and the copies of the signal may also be shifted a small amount of degrees. Comparison of the modulated low-frequency output signals over time permits determination of both calibration constants as well as the errors of phase shift between the two copies of the reference signals.

Conventional systems may encounter difficulties when attempting to measure absolute phase of signals with unknown characteristics. An embodiment of the present disclosure provides a low frequency phase modulation detection system that measures the difference between phases of an input test signal and a known reference signal, as opposed of measuring an absolute phase. Accordingly, the low frequency phase modulation detection system is tolerant of small amplitude modulations of either the test signal and/or the reference signal. This feature of the proposed low frequency phase modulation detection system is beneficial when the input test signal contains slight amplitude modulation (AM).

In one embodiment, the high frequency components of the phase modulation (e.g. the second stage) can be measured by mixing the test signal against a clock modulated with a low frequency components of the modulation of the test signal (e.g., the output of the first stage). The output from the mixer from the second stage contains only the high frequency phase modulation component. In at least one embodiment, the remaining high frequency phase modulation component is unaltered. In this manner, the high frequency modulation can be measured by filtering out low frequency components, and amplifying the remaining non-filtered components.

The techniques described above provide precise phase measurements by modulating two copies of an input test signal with two reference signals that are shifted 90 degrees with respect to each other. The stable reference signal is utilized to measure one or more unknown signals that may be present in an accurate and precise manner. The inventive teachings described herein can be useful in cases where precise phase measurements are desired when the calibration constant of the mixer is poorly known (e.g., when the test signal is amplitude modulated). Various non-limiting embodiments described herein also provide a multi-stage passive measurement system that obtains a low frequency phase of a first signal, and re-modulates the first signal using the low frequency of phase to obtain a second signal containing having only high-frequency modulation components. The second signal is then processed to identify the high-frequency characteristics. In this manner, the phase properties of a signal can be precisely measured without knowing in advance the frequency of the signal.

With reference now to FIG. 1, a low frequency phase modulation detection system 100 is illustrated according to a non-limiting embodiment. The low frequency phase detection system 100 includes a reference signal generator module 102, a signal phase adjuster module 104, and a phase identifier (ID) module 106. The reference signal generator module 102, signal phase adjuster module 104, and phase ID module 106 are each in signal communication with a first signal mixing circuit 108a and a second signal mixing circuit 108b. Any one of the reference signal generator module 102, signal phase adjuster module 104, and phase ID module 106 can be constructed as an electronic hardware controller that includes memory and a processor configured to execute algorithms and computer-readable program instructions stored in the memory.

The signal phase adjuster module 104 receives a reference signal (RS) 10 output from the reference signal generator module 102. The reference signal 10 can be generated as an analog sine wave, but is not limited thereto. For instance, the reference signal 10 can be generated as an analog cosine wave, for example. In at least one embodiment, the signal phase adjuster module 104 splits the reference signal 10 into two separate and independent reference signals 10a and 10b.

The split reference signals 10a and 10b are delivered to a first phase shifter circuit 110a and a second phase shifter circuit 110b, respectively. The phase shifter circuits 110a and 110b output two independent reference phase signals ($RS_1$) 14a and ($RS_2$) 14b. In at least one embodiment, the first and second reference phase signals 14a and 14b are identical in all respects, except that the second reference signal ($RS_1$) 14b is shifted 90 degrees in phase with respect to the first reference phase signal ($RS_1$) 14a. In some cases when the reference signal 10 is a sine wave, the following relationship between the first and second reference phase signals 14a and 14b holds true:

$$RS_1(t)=A \cdot \sin(\omega_0 t+\varphi_{RS}(t)+\pi/2+\vartheta);$$

$$RS_2(t)=A \cdot \sin(\omega_0 t+\varphi_{RS}(t)+\vartheta)$$

The value of "A" may be constant or may be changing in time slowly (as compared to $\omega_0$). It should be appreciated that additional formulas can be derived to account for errors that may cause the angles to deviate from 0 degrees and 90 degrees.

The first mixing circuit 108a and the second mixing circuit 108b are in signal communication with the signal phase adjuster module 104. In this manner, the first mixing circuit 108a receives the first reference phase signal 14a while the second mixing circuit 108b receives the second reference phase signal 14b. The first mixing circuit 108a further includes a first mixer module 112a and a first analog-to-digital converter (ADC) module 114a. Similarly, the second mixing circuit 108b includes a second mixer module 112a and a second ADC module 114b.

In at least one embodiment, the first and second mixer modules 112a and 112b are constructed as a nonlinear electrical circuit that receives two input signals, and generates an output signal having a new or modified frequency. Each of the first and second mixing circuits 108a and 108b also receive an input test signal (S(t)) 16, which is output from a signal generator 103. The input signal 16 serves as the signal to be analyzed using the reference signal 10.

The input signal 16 can be represented as a phase-modulated signal according to the following equation:

$$S(t)=B \cdot \sin(\omega(t) \cdot t)=B \cdot \sin(\omega_0 t+\varphi_S(t))$$

The input signal 16 can be split, and then mixed with each of the phase shifted copies of the reference signals 14a and 14b. For instance, the first mixer module 112a mixes the input signal 16 with the first reference phase signal 14a, while the second mixer module 112b mixes the input signal 16 with the second reference phase signal 14b (which is phase-shifted 90 degrees with respect to the first reference phase signal 14a). In at least one embodiment, the mixing executed by the first and second mixers 112a and 112b is an equivalent of multiplying the input signal 16 by its respective reference phase signal 14a and 14b. The low-frequency components of each signal combination (i.e., 16/14a and 16/14b) are filtered out via the respective mixers 112a and 112b, as denoted in FIG. 1. The resulting filtered signals are output from the mixers 112a and 112, respectively, as first and second low-frequency modulated signals 18a and 18b.

The first output signal 18a is delivered to the first ADC module 108a, and the second output signal 18b is delivered to the second ADC module 108b. The first ADC module 114a converts signal 18a into a first digital modulated signal ($SP_1(t)$) 20a having first low-frequency components. Similarly, the second ADC module 114b converts signal 18b into a second digital modulated signal ($SP_2(t)$) 20b having second low-frequency components. The first and second digital modulated signals 20a and 20b can be represented according to the following equations:

$$SP_1(t) = A \cdot \sin(\varphi_{RS}(t) - \varphi_S(t) + \pi/2 + \vartheta)$$

$$SP_2(t) = A \cdot \sin(\varphi_{RS}(t) - \varphi_S(t) + \vartheta)$$

The phase ID module 106 receives both the first digital modulated signal 20a and the second digital modulated signal 20b, and outputs a phase signal 22. In at least one embodiment, the phase signal 22 is a low frequency phase signal 22 that indicates a phase of the input test signal 16. The phase ID module 106 can generate the output phase signal 22 by shifting the phase of the signals (i.e., the first and second digital modulated signals 20a and 20b) as a function of time to keep them in quadrature, and generates a phase differential signal ($\varphi$). In this manner, the data represented by "$\varphi$" can be output as a low frequency phase signal 22. The operation applied to each digital modulated signal 20a and 20b by the phase ID module 106 can be represented by the following equation:

$$\varphi_{RS}(t) - \varphi_S(t) = -\vartheta + a\tan 2(SP_1(t), SP_2(t)),$$

where $\varphi_{RS}(t)$ is the phase of the reference signal (RS) as a function of time, and $\varphi_S(t)$ is the phase of the test signal 16 as a function of time. The bias ($-\vartheta$) is immaterial for most calculations and can be eliminated by proper calibration. The accuracy with which the value of $\varphi_{RS}(t) - \varphi_S(t)$ depends on two characteristics: the noise of the electronics (caused mostly the mixer module 112a and 112b) and the accuracy of the ADC modules 114a and 114b. The low frequency phase modulation detection system 100 operates ideally when the phase shifts and gains in the first signal mixing circuit 108a and the second signal mixing circuit 108b do not change faster than the lowest frequency of phase modulation being targeted or tested.

Figure 2:
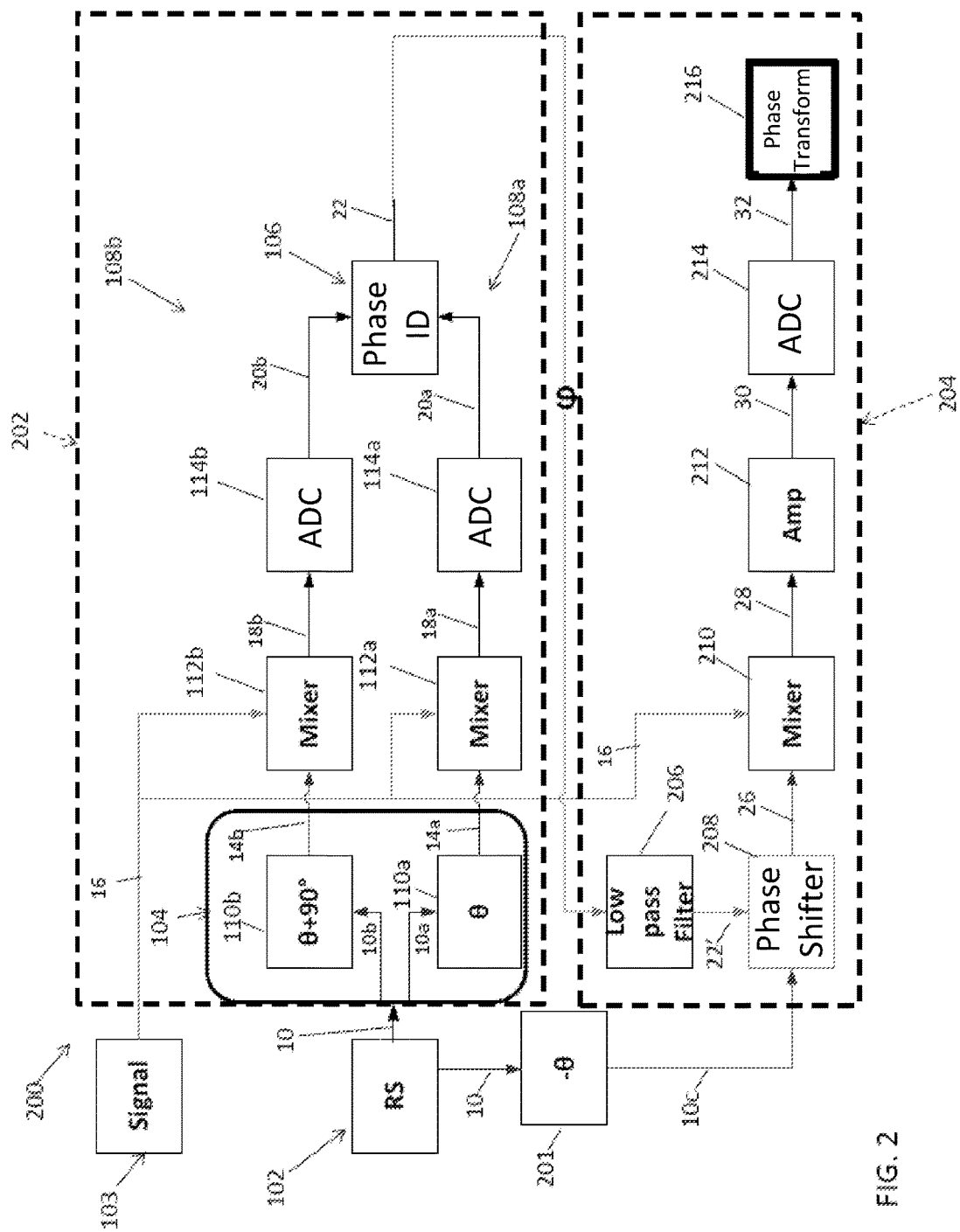
FIG. 2 illustrates a functional block diagram of a high frequency phase detection system according to a non-limiting embodiment.

With reference now to FIG. 2, a high frequency phase detection system 200 is illustrated according to a non-limiting embodiment. The high frequency phase detection system 200 provides a multi-stage passive measurement system that utilizes a low frequency phase signal 22 obtained using an input test signal 16, and modulates the phase-offset reference signal 10c based on the phase of the low frequency phase signal 22 to obtain a high-frequency modulated signal 28 containing only high-frequency modulation components. The high-frequency modulated signal 28 can then be precisely measured without knowing in advance the frequency of the input signal 16.

The high frequency phase detection system 200 includes a first stage 202 (i.e., a low frequency stage 202) and a second stage 204 (i.e., a high frequency stage 204). The first stage 202 operates in the same manner as described above. However, the low frequency phase generated by the first stage 202 (i.e., the low frequency output signal 22 generated by the phase ID module 106) is used to modulate the phase-offset reference signal 10c of the second stage 204.

The second stage 204 includes low-pass filter 206, low-frequency phase shifter module 208, mixer module 210, amplifier module 212, and ADC 214. As further illustrated in FIG. 2, the second stage 204 is in signal communication with an offset phase shifter 201, which is discussed in greater detail below. Any one of the low-frequency phase shifter module 208, mixer module 210, amplifier module 212, 214, and offset phase shifter 201 can be constructed as an electronic hardware controller that includes memory and a processor configured to execute algorithms and computer-readable program instructions stored in the memory According to at least one embodiment, the offset phase shifter 201 receives the reference signal 10 and generates a phase-offset reference signal 10c having a phase that is offset with respect to the initial phase of the reference signal 10 delivered to the first stage 102.

The low-pass filter 206 receives the low frequency phase signal 22 output from the first stage 202. The low-pass filter 206 is constructed with a given cut-off frequency. Accordingly, the low-pass filter 206 outputs a filtered low frequency signal 22' including various low frequency components satisfying the cut-off frequency criteria.

The low-frequency phase modulator 208 utilizes the low-pass frequency components of the filtered low frequency signal 22' to modulate the phase-offset reference signal 10c and generate a phase-modulated reference signal 26. For example, the low-frequency phase shifter 208 utilizes the offset frequency of the low frequency signal 22 which is passed through the low pass filter 206, along with other calibration data, to generate the phase-modulated reference signal 26.

The mixing module 210 is in signal communication with the reference signal generator 103 and the low-frequency phase shifter 208. The mixing module 210 mixes the phase-modulated reference signal 26 with the input signal 16 to generate a modulated frequency signal 28. The modulated frequency signal 28 is very close to zero because the phase difference between the phase-modulated reference signal 26 and the input signal 16 is very small. At this stage, the modulated frequency signal 28 not only cancels out low frequency components, but also lowers the frequency of the high frequency components down such that processing circuitry and other analytical electronic devices can further process the modulated frequency signal 28. In at least one embodiment, the mixing module 210 utilizes the phase of the low frequency phase signal 22 passed through the low pass filter at signal 22', along with the offset frequency indicated by the low-frequency phase modulator 208 to calculate the actual high frequency phase measurement results indicated by the modulated frequency signal 28.

The amplifier module 212 receives the modulated frequency signal 28 to increase the amplitude of the signal. The modulated frequency signal 28 is amplified in the second stage 204 to allow for improved analysis of subtle or small-scale characteristics included in the modulated frequency signal 28.

The ADC 214 is in signal communication with the amplifier module 212 to receive the amplified modulated frequency signal 30 which is received as an analog signal at the input of the ADC 214. Accordingly, the ADC 214 converts the amplified modulated frequency signal 30 into a digital modulated frequency signal 32. The digital modulated frequency signal 32 is the uncalibrated high-frequency phase measurement of the input test signal 16.

The phase transformer module 216 receives the digital modulated frequency signal 32 output from the ADC 214. Accordingly, the phase transformer module 216 converts the digital modulated frequency signal 32 into a high-frequency phase signal, by applying the proper amplitude and frequency offset calibration, that can be further analyzed and measured.

As described in detail above, a phase detection system is provided which includes a first stage configured to perform low frequency phase detection. A second stage can utilize the output of the first stage to perform high frequency phase detection. The first stage mixes two copies of an input test signal with two copies of a reference signal. The reference signals are shifted by 90 degrees with respect to each other. The outputs of the mixers are the sine and cosine components of the phase difference, correspondingly, and can be utilized to determine the phase of the input test signal. The techniques described herein can be optimized when the rate of change between the average frequencies of the reference signal 10 and the input signal 16 is relatively small (because the electronically controlled phase shifter in the high frequency stage has a limited range).

As used herein, the term "module" refers to an application specific integrated circuit (ASIC), an electronic circuit, a computer processor (shared, dedicated, or group) and memory that executes one or more software or firmware programs, a combinational logic circuit, a microcontroller including various inputs and outputs, and/or other suitable components that provide the described functionality. When implemented in software, a module can be embodied in memory as a non-transitory machine-readable storage medium readable by a processing circuit (e.g., a microprocessor) and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A high-frequency multi-stage phase detection system comprising:
   a first circuit stage, comprising:
   a signal phase adjuster processor configured to generate a first reference phase signal having a first phase and a second reference phase signal having a second phase that is offset with respect to the first phase; and
   a phase identification (ID) processor configured to generate a first modulated analog signal based on an input signal and a first reference signal, to generate a second modulated analog signal based on a second reference signal and the input signal, and to generate an output phase signal based on a phase differential ($\Phi$) between a first phase angle of the first modulated analog signal and a second phase angle of the second modulated analog signal; and
   a second circuit stage, comprising:
   a low pass filter in signal communication with the phase ID processor, the low pass filter configured to receive a phase-offset reference signal having a phase that is offset with respect to the initial phase of the reference signal delivered to the first stage, and to output a filtered low frequency signal based on the output phase signal and the phase-offset reference signal,
   wherein the low frequency phase signal includes the phase indicated by the phase signal, and wherein the input signal is mixed with the phase-modulated reference signal to generate a modulated frequency signal including high frequency components.

2. The multi-stage detection system of claim 1, further comprising:
   a reference signal generator configure to generate the first reference signal; and
   an offset phase shifter 201 in signal communication with the reference signal generator to generate the phase-offset reference signal based on the first reference signal.

3. The multi-stage phase detection system of claim 2, wherein the second stage further comprises:
   a low-frequency phase shifter processor in signal communication with the low pass filter, the low-frequency phase shifter processor module configured to generate a phase-modulated reference signal based on the filtered low frequency signal and a phase-offset reference signal; and
   a second stage mixer processor module in signal communication with the low-frequency phase shifter processor, the second stage mixer processor modulo configured to generate a modulated frequency signal based on the phase-modulated reference signal and the input signal.

4. The multi-stage phase detection system of 3, wherein the first circuit stage comprises:
   a signal phase adjuster processor configured to generate a first reference phase signal having a first phase and a second reference phase signal having a second phase that is offset with respect to the first phase;
   a first mixing circuit in signal communication with the signal phase adjuster processor, the first mixing circuit configured to receive an input signal, and to generate a first digital modulated frequency signal based on the first reference phase signal and the input signal;
   a second mixing circuit in signal communication with the signal phase adjuster processor, the second mixing circuit configured to receive the input signal, and to generate a second digital modulated frequency signal based on the second reference phase signal and the input signal; and
   a phase identification (ID) processor in signal communication with the first mixing circuit and the second mixing circuit, the phase ID processor module configured to generate the output phase signal based on the first digital modulated frequency signal and the second digital modulated frequency signal.

5. The multi-stage phase detection system of claim 4, wherein the second phase is offset 90 degrees with respect to the first phase.

6. The multi-stage phase detection system of claim 4, wherein the signal phase adjuster processor comprises:

a first phase shifter circuit in signal communication with the reference signal generator, the first phase shifter circuit configured to generate the first reference phase signal based on the reference signal generated by the reference signal generator; and a second phase shifter circuit in signal communication with the reference signal generator, the second phase shifter circuit configured to generate the second reference phase signal based on the reference signal.

7. The multi-stage phase detection system of claim 6, wherein:

the first mixing circuit mixes the input signal with the first reference phase signal to generate a first modulated analog signal, and digitizes the first modulated analog signal to generate the first digital modulated frequency signal, and the second mixing circuit mixes the input signal with the second reference phase signal to generate a second modulated analog signal, and digitizes the second modulated analog signal to generate the second digital modulated frequency signal.

8. The multi-stage phase detection system of claim 7, wherein:

the first mixing circuit comprises:

a first mixer processor that multiplies the input signal with the first reference phase signal; and a first analog-to-digital converter (ADC) processor in signal communication with the first mixer processor, the ADC processor configured to generate the first digital modulated frequency signal based on the first modulated analog signal; and the second mixing circuit comprises:

a second mixer processor that multiplies the input signal with the second reference phase signal; and a second ADC processor module in signal communication with the second mixer processor, the second ADC processor module configured to generate the second digital modulated frequency signal based on the second modulated analog signal.

9. The multi-stage phase detection system of 4, further comprising a second stage ADC configured to convert the modulated frequency signal into a digital modulated frequency signal.

10. The multi-stage phase detection system of claim 9, further comprising an amplifier processor connected between the second stage mixer processor and second stage ADC, the amplifier processor configured to increase the amplitude of the modulated frequency signal.

11. The multi-stage phase detection system of claim 4, further comprising a phase transformer processor that converts the digital modulated frequency signal into a high-frequency phase signal.

12. A method of measuring a phase-modulated signal with changing amplitude, the method comprising:

generating, via a signal phase adjuster processor configured, a first reference phase signal having a first phase a second reference phase signal having a second phase that is offset with respect to the first phase;

generating, via a phase identification (ID) processor, a first modulated analog signal based on an input signal and a first reference signal;

generating, via the phase identification (ID) processor, a second modulated analog signal based on a second reference signal and the input signal;

generating, via a phase identification (ID) processor, an output phase signal based on a phase differential (Φ) between a first phase angle of the first modulated analog signal and a second phase angle of the second modulated analog signal;

receiving, via a low pass filter in signal communication with the phase ID processor, a phase-offset reference signal having a phase that is offset with respect to the initial phase of the reference signal delivered to the first stage; and outputting a filtered low frequency signal based on the output phase signal and the phase-offset reference signal, wherein the low frequency phase signal includes the phase indicated by the phase signal, and wherein the input signal is mixed with the phase-modulated reference signal to generate a modulated frequency signal including high frequency components.

13. The method of claim 12, further comprising:

generating, via a reference signal generator, the first reference signal; and generating, via an offset phase shifter in signal communication with the reference signal generator, the phase-offset reference signal based on the first reference signal.

14. The method of claim 13, wherein the second stage further comprises:

generating, via a low-frequency phase shifter processor in signal communication with the low pass filter, a phase-modulated reference signal based on the filtered low frequency signal and a phase-offset reference signal; and generating, via a second stage mixer processor in signal communication with the low-frequency phase shifter processor, a modulated frequency signal based on the phase-modulated reference signal and the input signal.

15. The method of claim 14, further comprising:

generating, via a signal phase adjuster processor, a first reference phase signal having a first phase and a second reference phase signal having a second phase that is offset with respect to the first phase;

receiving, via a first mixing circuit in signal communication with the signal phase adjuster processor, an input signal;

generating, via the first mixing circuit, a first digital processor frequency signal based on the first reference phase signal and the input signal;

generating, via a second mixing circuit in signal communication with the signal phase adjuster processor, a second digital modulated frequency signal based on the second reference phase signal and the input signal; and generating, via a phase identification (ID) processor in signal communication with the first mixing circuit and the second mixing circuit, the output phase signal based on the first digital modulated frequency signal and the second digital modulated frequency signal.

16. The method of claim 15, further comprising offsetting the second phase 90 degrees with respect to the first phase.

17. The method of claim 15, further comprising:

generating, via a first phase shifter circuit in signal communication with the reference signal generator, the first reference phase signal based on the reference signal generated by the reference signal generator; and generating, via a second phase shifter circuit in signal communication with the reference signal generator, the second reference phase signal based on the reference signal.

18. The method of claim 17, further comprising:
mixing, via the first mixing circuit, the input signal with the first reference phase signal to generate a first modulated analog signal;
digitizing the first modulated analog signal to generate the first digital modulated frequency signal;
mixing, via the second mixing circuit, the input signal with the second reference phase signal to generate a second modulated analog signal; and
digitizing the second modulated analog signal to generate the second digital modulated frequency signal.

19. The method of claim 15, further comprising converting, via a second stage ADC, the modulated frequency signal into a digital modulated frequency signal.

20. The method of claim 15, further comprising converting, via a phase transformer processor, the digital modulated frequency signal into a high-frequency phase signal.

* * * * *